(12) United States Patent
Grubenhoff

(10) Patent No.: US 9,463,751 B1
(45) Date of Patent: Oct. 11, 2016

(54) STORAGE CONTAINER FOR A TRUCK BED

(71) Applicant: Brad Grubenhoff, Tempe, AZ (US)

(72) Inventor: Brad Grubenhoff, Tempe, AZ (US)

( * ) Notice: Subject to any disclaimer, the term of this patent is extended or adjusted under 35 U.S.C. 154(b) by 0 days.

(21) Appl. No.: 14/097,455

(22) Filed: Dec. 5, 2013

Related U.S. Application Data

(60) Provisional application No. 61/763,132, filed on Feb. 11, 2013.

(51) Int. Cl.
*B60R 9/06* (2006.01)
*B62D 33/04* (2006.01)
*B60R 13/01* (2006.01)

(52) U.S. Cl.
CPC ............. *B60R 9/065* (2013.01); *B60R 13/01* (2013.01); *B62D 33/046* (2013.01)

(58) Field of Classification Search
CPC ......... B60R 9/06; B60R 9/065; B60R 13/01; B62D 33/02; B62D 33/023; B62D 33/0273; B62D 33/04; B62D 33/046
USPC .............. 296/37.5, 37.6, 50, 100.01, 136.04; 224/42.34, 403, 404, 517, 543
See application file for complete search history.

(56) References Cited

U.S. PATENT DOCUMENTS

| | | | | |
|---|---|---|---|---|
| 3,393,936 A * | 7/1968 | Hall | | 296/24.44 |
| 4,451,075 A * | 5/1984 | Canfield | | 296/37.6 |
| 4,749,226 A * | 6/1988 | Heft | | 296/37.6 |
| 4,828,312 A * | 5/1989 | Kinkel et al. | | 296/37.6 |
| 5,083,829 A * | 1/1992 | Fonseca | | 296/37.6 |
| 5,992,719 A * | 11/1999 | Carter, III | | 224/404 |
| 6,073,985 A * | 6/2000 | Keip | | 296/37.6 |
| 2002/0190536 A1* | 12/2002 | Getzschman et al. | | 296/37.6 |
| 2009/0250962 A1* | 10/2009 | Polewarczyk et al. | | 296/57.1 |
| 2012/0261451 A1* | 10/2012 | Roach et al. | | 224/404 |
| 2012/0261452 A1* | 10/2012 | Roach et al. | | 224/404 |
| 2013/0015678 A1* | 1/2013 | Williamson et al. | | 296/100.09 |

* cited by examiner

*Primary Examiner* — Jason S Daniels
(74) *Attorney, Agent, or Firm* — Kenneth L Tolar

(57) ABSTRACT

A storage container for a truck bed includes a horizontal upper panel, a vertical front panel, a horizontal lower panel spaced from the upper panel and an open rear face that define an interior storage compartment. The lower panel is attached to the bottom surface of the truck bed with the open rear immediately adjacent to the tailgate, whereby when the tailgate is pivoted to an upright, closed position, the tailgate closes the open rear face to prevent access to the interior storage compartment. The upper panel and lower panel are hingedly attached to the front panel so that the three panels are foldable onto each other, or into a completely-flat orientation, against the truck bed to accommodate cargo, if necessary.

5 Claims, 2 Drawing Sheets

STORAGE CONTAINER FOR A TRUCK BED

CROSS REFERENCE TO RELATED APPLICATIONS

This application is entitled to the benefit of provisional patent application No. 61/763,132 filed on Feb. 11, 2013, the specification of which is incorporated herein by reference.

BACKGROUND OF THE INVENTION

The present invention relates to a storage container for securing valuables within a truck bed.

DESCRIPTION OF THE PRIOR ART

Securing valuables within a pickup truck bed is challenging. Chaining or cabling such items is laborious and is completely ineffective if a thief has a bolt cutter or similar tool. Locking-style toolboxes for truck beds are unsightly and occupy valuable storage space. Accordingly, there is currently a need for a storage container that allows a user to inconspicuously secure valuables within a truck bed. The present invention addresses this need by providing a low-profile storage container that can be compactly collapsed to allow the truck bed to accommodate larger cargo, if necessary.

SUMMARY OF THE INVENTION

The present invention relates to a storage container for a truck bed including a horizontal upper panel, a vertical front panel, a horizontal lower panel spaced from the upper panel and an open rear face that define an interior storage compartment. The lower panel is attached to the bottom surface of the truck bed with the open rear face immediately adjacent to the tailgate, whereby when the tailgate is pivoted to an upright, closed position, the tailgate closes the open rear face to prevent access to the interior storage compartment. The upper panel and lower panel are hingedly attached to the front panel so that the three panels are foldable onto each other, or into a completely-flat orientation, against the truck bed to accommodate cargo, if necessary.

It is therefore an object of the present invention to provide a collapsible storage container for a truck bed.

It is another object of the present invention to a provide a storage container for a truck bed that is inconspicuously concealed by the tailgate.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
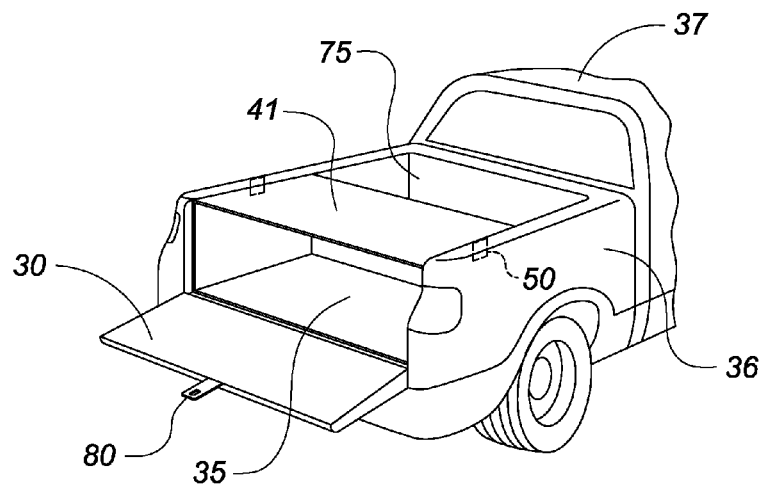
FIG. 1 depicts a truck bed with the storage container according to the present invention concealed therein.
Figure 2:
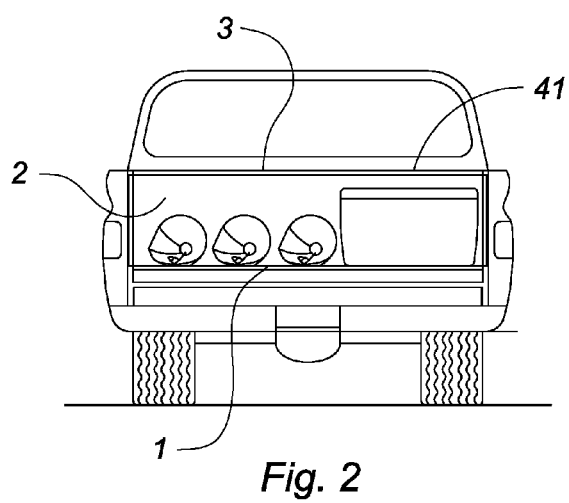
FIG. 2 depicts the truck bed of FIG. 1 with the tailgate open to expose the container interior.
Figure 3:
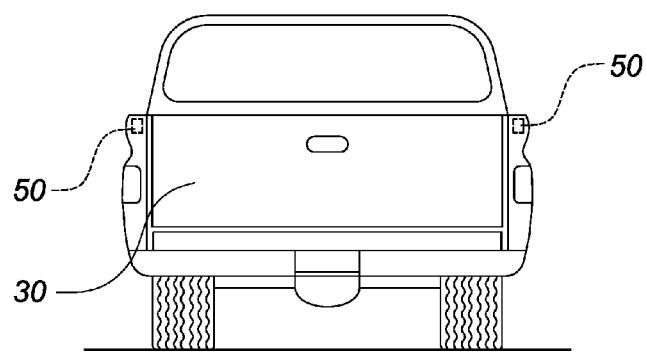
FIG. 3 depicts the truck bed of FIGS. 1 and 2 with the storage container concealed therein.
Figure 4:
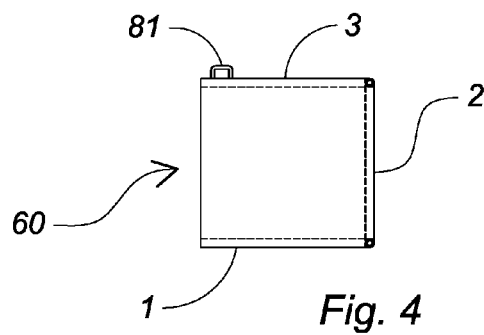
FIG. 4 is an isolated, side view of the container in an erected configuration.
Figure 5:
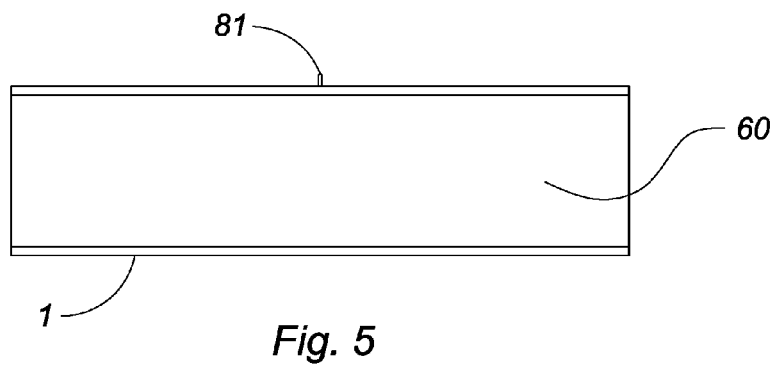
FIG. 5 is an isolated rear view of the container in an erected configuration.

The present invention relates to a storage container for a typical truck bed that is defined by a bottom surface 35, a pair of opposing sidewalls 36, a front wall 75 near the cab 37 and a locking rear tailgate 30 that pivots between an open and closed position. A receptacle 50 is formed within each of the sidewalls, near the tailgate, for securing the container as set forth in more detail below.

Figure 6:
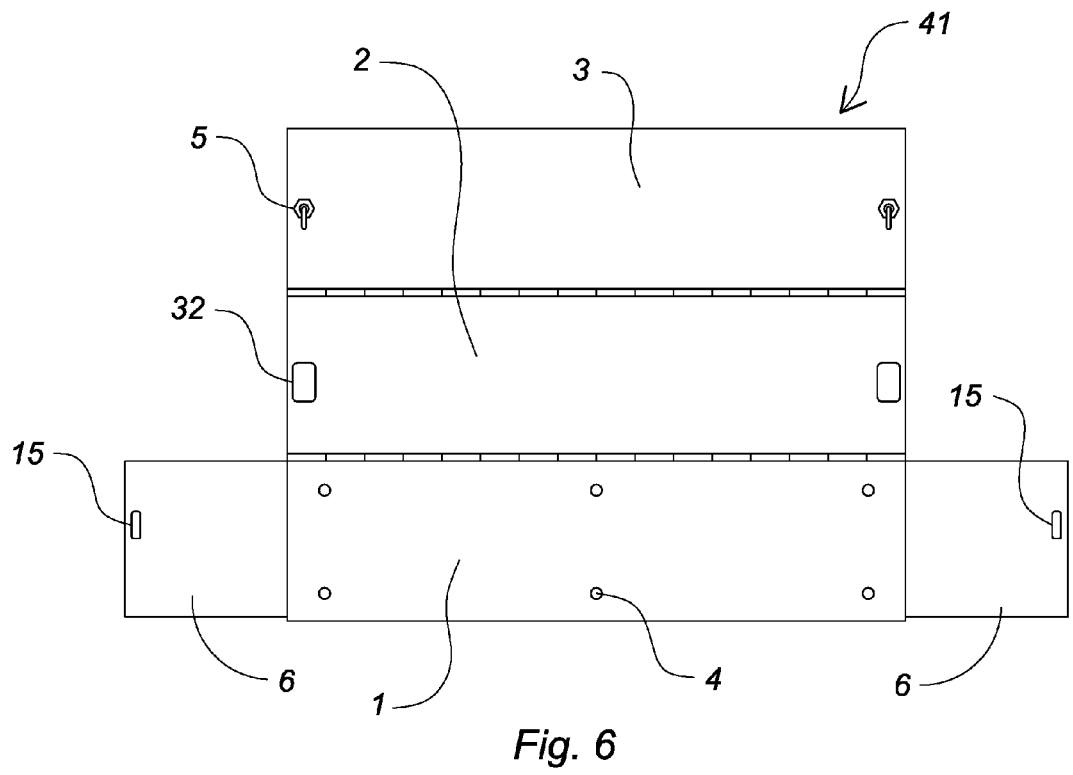
FIG. 6 is an isolated view of the container in a completely collapsed configuration.

The container according to the present invention, depicted generally at 41, comprises a lower panel 1, a front panel 2 and an upper panel 3. The upper panel and lower panels are hingedly attached to the rear panel so that the three panels are foldable onto each other, or into a completely flat, horizontal position as depicted in FIG. 6. The lower panel includes a plurality of apertures 4 for receiving fasteners to secure the container to the bottom surface 35 of the truck bed. The upper panel includes a pair of opposing, key-actuated latches 5 that removably seat within the receptacles 50 formed in the truck-bed sidewalls. The front panel includes a pair of indentions 32 that are configured to receive the latches to allow the upper panel to be folded onto the front panel, if desired. A hasp 80 fastened to the upper edge of the tailgate fits over a ring 81 on the upper panel and a padlock is secured to the ring to prevent unauthorized access to the container contents.

Each side edge of the lower panel may include a hinged side panel 6 that locks within a small recess in the upper panel when the device is erected. Each side panel includes a slot 15 that aligns with one of the receptacles 50 to allow the latch to pass through the side panel and into the receptacle.

To install the container, a user attaches the lower panel to the bottom surface of the truck bed, with its rear edge immediately adjacent to, or aligned with the rear edge of the truck-bed bottom surface. The front panel and upper panel are laid flat on the bottom surface of the truck bed, extending toward the truck cab. Accordingly, until the container is needed, cargo may be easily stored atop the collapsed panels.

To form a storage container, a user pivots the front panel to a vertical position and the upper panel to a horizontal position, substantially parallel to the lower panel. If the device is equipped with side panels, they are pivoted to a vertical position to form a box-shaped enclosure having an open rear face 60. The latches are locked in their respective receptacles and valuables are placed within the open-faced enclosure. When the tailgate is closed and locked, the rear edges of the upper panel and lower panel abut the inner surface of the tailgate to secure the valuables within the enclosure. Furthermore, because the container is low-profile and is positioned at the rear of the truck bed, it is concealed from passersby so as not to entice a potential thief. When transporting larger cargo, a user may dismantle and collapse the container into a flat configuration, resting on the bottom surface of the truck bed, allowing cargo to be placed thereon.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The invention claimed is:

1. In combination with a truck bed having a bottom surface, two opposing sidewalls, each of said sidewalls having a receptacle formed thereon, and a rear tailgate that is pivotal between a horizontal and vertical position, a container comprising:

a lower panel having a rear edge, a front edge and a pair of opposing side edges, each of said side edges having a side panel hingedly attached thereto;

a front panel having an upper edge and a lower edge;

an upper panel having a rear edge and a front edge, the front edge of said upper panel hingedly attached to the upper edge of said front panel, the front edge of said lower panel hingedly attached to the lower edge of said front panel so that said lower panel, said front panel and said upper panel are foldable onto each other but pivotal into a position wherein said upper panel and said lower panel are parallel and said rear panel is perpendicular to said upper panel and said lower panel;

means for fastening said lower panel to the bottom surface of said truck bed with the rear edge of said lower panel immediately adjacent to said tailgate;

means for securing each of two opposing ends of said upper panel to one of said sidewalls wherein said means comprises a latch adjacent to each of said two opposing ends, said latch removably seating within the receptacle on one of said sidewalls;

a slot on said side panel that aligns with one of said receptacles to allow said latch to pass through said side panel and into said receptacle, whereby said upper panel, said lower panel, said front panel, said sidewalls and said tailgate form an enclosure for securing and concealing valuables.

2. The container according to claim 1 wherein said front panel includes a pair of indentions that are each configured to receive said latch to allow said upper panel to be flatly collapsed onto said front panel.

3. The container according to claim 1 further comprising:
a ring on said upper panel;
a hasp fastened to an upper edge of said tailgate for receiving said ring;
a lock secured to said ring to prevent unauthorized access to said enclosure.

4. The container according to claim 1 wherein said latch is key actuated.

5. The container according to claim 1 wherein said means for fastening said lower panel to the bottom surface of said truck bed with the rear edge of said lower panel immediately adjacent to said tailgate comprises a plurality of apertures on said lower panel with fasteners received therein and secured to said bottom surface.

* * * * *